US008717277B2

(12) United States Patent
Chang et al.

(10) Patent No.: US 8,717,277 B2
(45) Date of Patent: May 6, 2014

(54) METHOD AND APPARATUS OF APPROXIMATING BACKLIGHT SPREAD IN A LOCAL DIMMING SYSTEM

(75) Inventors: Chih-Kai Chang, Taichung (TW); Yu-Li Wu, Hsinchu (TW)

(73) Assignee: Orise Technology Co., Ltd., Hsinchu Science Park (TW)

( * ) Notice: Subject to any disclaimer, the term of this patent is extended or adjusted under 35 U.S.C. 154(b) by 252 days.

(21) Appl. No.: 13/444,040

(22) Filed: Apr. 11, 2012

(65) Prior Publication Data

US 2013/0016036 A1 Jan. 17, 2013

(30) Foreign Application Priority Data

Jul. 12, 2011 (TW) ............................ 100124620 A

(51) Int. Cl.
*G09G 3/36* (2006.01)
*G09G 3/32* (2006.01)
*G09F 13/04* (2006.01)
*G06F 3/038* (2013.01)
*G09G 5/10* (2006.01)

(52) U.S. Cl.
USPC ............... 345/102; 345/82; 345/90; 345/207; 345/690; 362/97.2; 362/97.3

(58) Field of Classification Search
USPC ....................... 345/55, 82–92, 102, 207, 690; 362/97.1–97.3
See application file for complete search history.

(56) References Cited

U.S. PATENT DOCUMENTS

| | | | | |
|---|---|---|---|---|
| 8,643,593 B2 * | 2/2014 | Chang et al. | ................. | 345/102 |
| 2007/0001943 A1 * | 1/2007 | Lee et al. | ........................ | 345/83 |
| 2010/0053222 A1 * | 3/2010 | Kerofsky | ...................... | 345/690 |
| 2010/0156955 A1 * | 6/2010 | Kimura | ......................... | 345/690 |
| 2013/0016141 A1 * | 1/2013 | Chang et al. | ................. | 345/691 |

* cited by examiner

*Primary Examiner* — Lun-Yi Lao
*Assistant Examiner* — Jarurat Suteerawongsa
(74) *Attorney, Agent, or Firm* — Bacon & Thomas, PLLC

(57) ABSTRACT

An apparatus of approximating backlight spread is used in a display to estimate a backlight spread image corresponding to an image after backlight spreading of a plurality of backlight sources arranged in a matrix form. An equalizer receives backlight pulse width modulation signals of the backlight sources for performing an equalization operation and generating corresponding equalization signals. A backlight seed image constructor receives the equalization signals to establish a backlight seed image. A first calculation unit calculates positions corresponding to the backlight seed image based on a backlight spread image. A second calculation unit calculates coordinates of the backlight seed image corresponding to the positions. A distance calculator calculates distance differences between the positions and coordinates of the backlight seed image. A bilinear transformation unit performs a bilinear transformation on pixels of the backlight seed image and the distance differences so as to generate the backlight spread image.

20 Claims, 4 Drawing Sheets

METHOD AND APPARATUS OF APPROXIMATING BACKLIGHT SPREAD IN A LOCAL DIMMING SYSTEM

CROSS REFERENCE TO RELATED APPLICATION

This application claims the benefits of the Taiwan Patent Application Serial Number 100124620, filed on Jul. 12, 2011, the subject matter of which is incorporated herein by reference.

BACKGROUND OF THE INVENTION

1. Field of the Invention

The present invention relates to the technical field of backlight local dimming and, more particularly, to a method and apparatus of approximating backlight spread in a local dimming system.

2. Description of Related Art

Multiple backlight sources are typically used in a current liquid crystal display (LCD) device for controlling a plurality of display areas of the LCD device to save the power. The backlight local dimming indicates that the backlight sources of the LCD device are adjusted according to the image brightness, but not in a state of full brightness.

Typically, the backlight sources of the LCD device operate at full brightness. The display of a dark frame is achieved by reducing the transmittance of liquid crystal rather than the reduction of power consumption. By contrast, the backlight local dimming allows the brightness of backlight source to be varied with changed dark and light frames, so that the brightness of backlight source is reduced when a dark frame is displayed. Thus, the entire amount of power consumption relating to the backlight sources is reduced.

In addition to the power consumption reduction, the backlight local dimming can improve the frame quality of the LCD device. For example, the dynamic contrast is dramatically increased. In addition, the backlight local dimming can be applied in the backlight sources to further increase the number of gray scales on the LCD device.

According to the entire power consumption of an LCD device, the backlight module typically occupies the largest proportion, which is about 66%. Furthermore, the trend of LCD devices develops to a large size, and thus the frames to be displayed require higher brightness, which consume more power. From the viewpoint of power saving, the backlight local dimming can relatively reduce the amount of power consumption on the large LCD device. In addition, the increase on the frame quality provides the optimal solution for the current backlight sources.

A typical backlight local dimming can first generate backlight signals to provide the backlight intensity spread data, then perform a convolution operation on the backlight signals and the backlight intensity spread data, and finally generate LCD compensation signals in accordance with the data generated in the convolution operation. Namely, the prior art has to establish a light spread function (LSF) for obtaining brightness spreading of the pixels on the panel when the backlight sources are turned on. Next, the established light spread function convolutes the backlight values decided for the blocks to emulate the actual spreading of backlight intensities of the backlight sources. However, the light spread function of the backlight sources influences the entire display panel, and the amount of data is very large so that a relatively large of storage space is required for completing the convolution operation.

Accordingly, such a complicated operation process in the prior art may cause high hardware cost and additional operation time.

To overcome this, another prior art uses a blurring process to obtain the light spread function. The blurring process uses a low pass filter (LPF) to operate the blurring and amplification for several times. However, the LPF also needs the complicated operation.

Therefore, it is desirable to provide an improved method and apparatus of approximating backlight spread in a local dimming system to mitigate and/or obviate the aforementioned problems.

SUMMARY OF THE INVENTION

The object of the present invention is to provide a method and apparatus of approximating backlight spread in a local dimming system, for reducing the amount of computation and the required hardware area so as to have the optimal power consumption.

In one aspect of the invention, there is provided a method of approximating backlight spread in a local dimming system for use in a display to estimate a backlight spread image corresponding to an image after backlight spreading of a plurality of backlight sources, The image, the backlight spread image, and the display have the same resolution, and the backlight sources are arranged in a matrix form. The method includes the steps of: (A) receiving backlight pulse width modulation (PWM) signals of the backlight sources for performing an equalization operation and generating corresponding equalization signals; (B) establishing a backlight seed image based on the equalization signals; (C) calculating a plurality of positions corresponding to the backlight seed image based on coordinates of the backlight spread image; (D) calculating coordinates of the backlight seed image corresponding to the positions; (E) calculating distance differences between the positions and coordinates of the backlight seed image; and (F) performing a bilinear transformation on pixels of the backlight seed image and the distance differences so as to generate the backlight spread image.

In another aspect of the invention, there is provided an apparatus of approximating backlight spread in a local dimming system for use in a display to estimate a backlight spread image corresponding to an image after backlight spreading of a plurality of backlight sources. The image, the backlight spread image, and the display have the same resolution. The backlight sources are arranged in a matrix form. The apparatus includes an equalizer, a backlight seed image constructor, a first calculation unit, a second calculation unit, a distance calculator, and a bilinear transformation unit. The equalizer receives backlight pulse width modulation (PWM) signals of the backlight sources for performing an equalization operation and generating corresponding equalization signals. The backlight seed image constructor is connected to the equalizer for receiving the equalization signals to establish a backlight seed image. The first calculation unit is connected to the backlight seed image constructor for calculating a plurality of positions corresponding to the backlight seed image based on coordinates of a backlight spread image. The second calculation unit is connected to the first calculation unit for calculating coordinates of the backlight seed image corresponding to the positions. The distance calculator is connected to the second calculation unit for calculating distance differences between the positions and coordinates of the backlight seed image. The bilinear transformation unit is connected to the distance calculator for performing a bilinear transformation on pixels of the backlight seed image and the distance differences so as to generate the backlight spread image.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
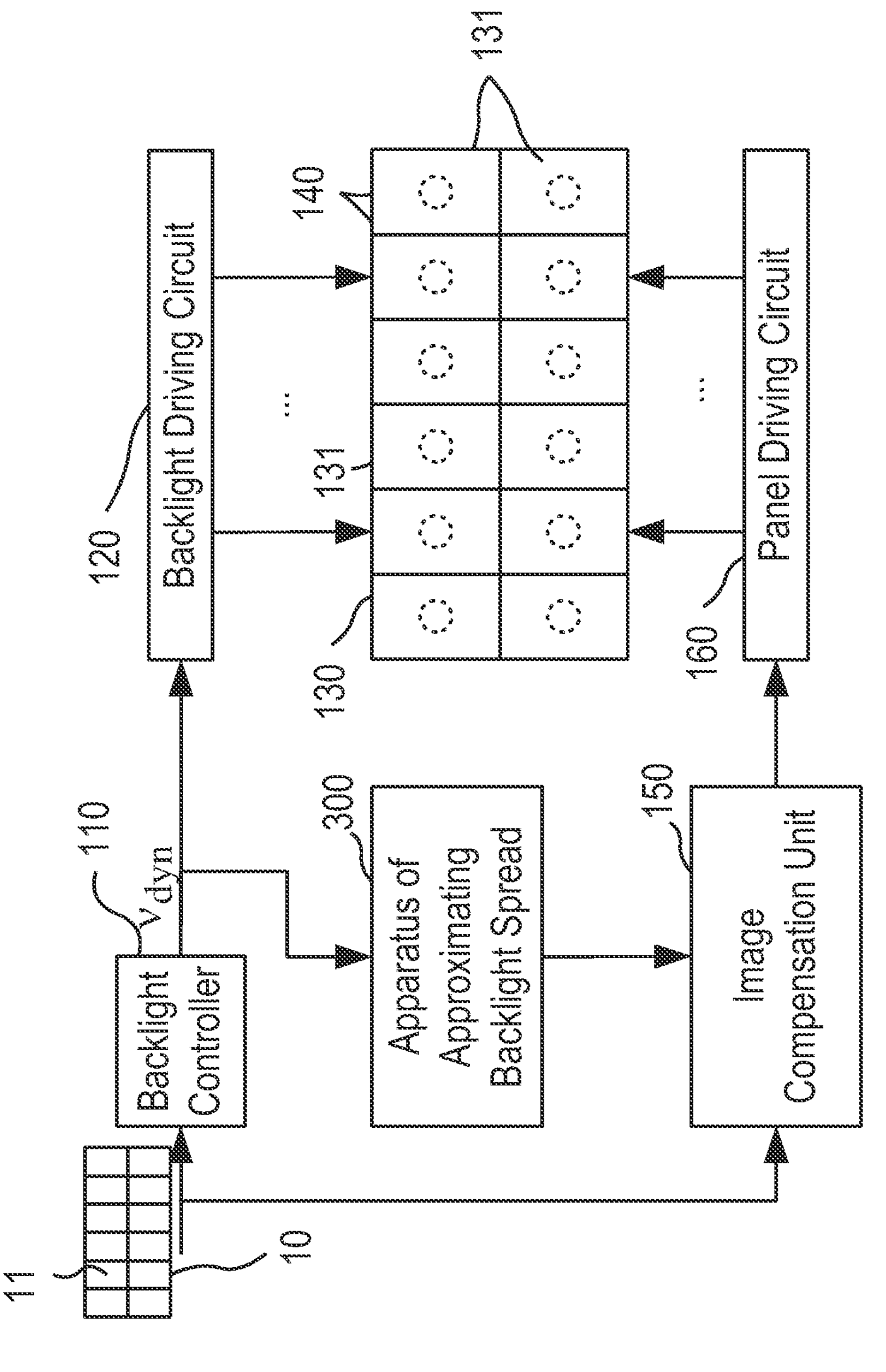
FIG. 1 is a schematic diagram illustrating an application of an apparatus of approximating backlight spread in a local dimming system in accordance with an embodiment of the invention.

FIG. 1 is a schematic diagram illustrating an application of an apparatus 300 of approximating backlight spread in a local dimming system in accordance with an embodiment of the invention. In FIG. 1, the apparatus 300 of approximating backlight spread is suitable for a liquid crystal display (LCD) device. The LCD panel 130 of the LCD device is implemented with a plurality of backlight sources 140 in a matrix arrangement at the back side of the LCD panel 130. The LCD panel 130 includes a plurality of blocks 131 arranged in a matrix form, wherein the blocks 131 respectively correspond to the backlight sources 140 controlled and driven by a backlight driving circuit 120, such that the backlight sources can provide lighting to the blocks 131 of the LCD panel 130 for display.

As shown in FIG. 1, a backlight controller 110 receives an image 10 and, generates the backlight pulse width modulation (PWM) signals ($v_{dyn}$) of the backlight sources. The image is preferred to have an RGB format.

The image 10 is divided into a plurality of image blocks 11 respectively corresponding to the plurality of backlight sources 140. Namely, the LCD panel 130 is deemed to include the plurality of blocks 131 arranged in a matrix form, each block 131 corresponding to one of the image blocks 11 for thus displaying the image 10 and also corresponding to one of the backlight sources 140. The plurality of backlight sources each are controlled and driven by the backlight driving circuit 120 for providing lighting to the blocks 131 of the LCD panel 130 for display.

As shown in FIG. 1, the LCD panel 130 is divided into, for example, blocks 131 of two rows and six columns based on the number of backlight sources 140. In other embodiments, for an example of LCD panels 130 with a resolution of 1920×1080, the blocks 131 are arranged in a matrix form of eight rows and sixteen columns, i.e., the number of backlight sources 140 is 16×8, and each block has 120×135 pixels. The resolution of the image to be displayed on the LCD panel 130 is not certainly equal to that of the LCD panel 130. However, after being processed by a scaler (not shown) of the LCD panel 130, the resolution of the image to be displayed on the LCD panel 130 is the same as that of the LCD panel 130. Therefore, the image 10 can be divided into a plurality of image blocks 11 with a number equal to that of the plurality of backlight sources 140.

In this embodiment, the method for approximating backlight spread in a local dimming system is suitable for a display to estimate the pixel values of the image 10 after backlight spreading of the backlight sources 140 of the local dimming system, so as to generate a backlight spread image (not shown). The image 10, the backlight spread image, and the display have the same resolution.

The backlight driving circuit 120 receives the backlight pulse width modulation signals ($v_{dyn}$) for respectively controlling and driving the backlight sources 140, so as to control the backlight areas to save the power. The apparatus 300 of approximating backlight spread in a local dimming system is connected to the backlight controller 110 in order to receive the backlight pulse width modulation signals ($v_{dyn}$) for further estimating the pixel values of the image after backlight spreading of the backlight sources 140 so as to generate a backlight spread image.

An image compensation unit 150 compensates the input image data based on the backlight spread image, and a panel driving circuit 160 drives the pixels of the blocks 131 of the LCD panel 130.

Figure 2:
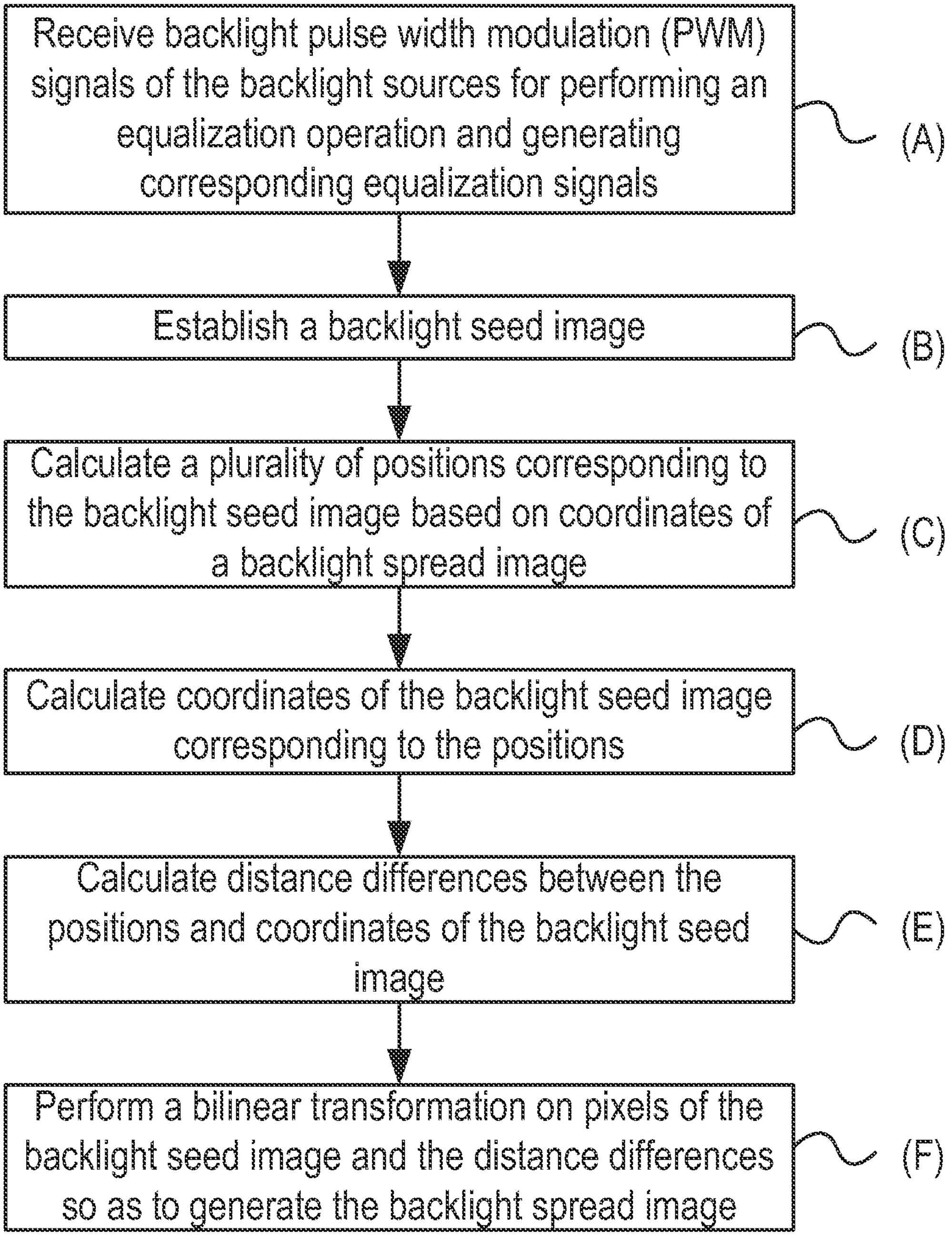
FIG. 2 is a flowchart of a method of approximating backlight spread in a local dimming system in accordance with an embodiment of the invention.

FIG. 2 is a flowchart of a method for approximating backlight spread in a local dimming system in accordance with an embodiment of the invention. The method is used in an LCD device to estimate pixel values of an image after backlight spreading of a plurality of backlight sources in a local dimming system.

First, step (A) receives backlight pulse width modulation signals ($v_{dyn}$) of the backlight sources 140 for performing an equalization operation on the backlight pulse width modulation signals and generating a corresponding equalization signals. The equalization operation in step (A) can be expressed as follows:

$$v_{mod} = A \times \left(\frac{v_{dyn}}{A}\right)^{\frac{1}{\gamma}},$$

where $v_{mod}$ indicates equalization signal, $v_{dyn}$ indicates a backlight pulse width modulation signal, and A indicates an adjustment parameter. When the image 10 is preferred to be in an RGB format and each of R, G and B pixels has 8 bits, A is preferred to be 255 and γ is preferred to be 2.2. In other embodiments, γ is adjustable. The backlight pulse width modulation signals are used to adjust the brightness of the backlight sources 140 of the blocks 131 of the LCD panel 130 and thus have values ranging from 0 to 100. In this case, the equalization signals range from 0 to 255. When a backlight pulse width modulation signal is too small, it is likely to cause an overcompensation effect, and thus a Gamma correction is applied to the backlight pulse width modulation signal $v_{dyn}$.

Step (B) establishes a backlight seed image in accordance with the equalization signals. The pixels of the backlight seed image can be expressed as follows:

$$\text{pixel}(l,k)=v_{mod}(l,k),$$

where $0 \le l \le W_{ref\_img}-1$, $0 \le k \le H_{ref\_img}-1$, $W_{ref\_img}$ indicates a width of the backlight seed image, and $H_{ref\_img}$ indicates a height of the backlight seed image. Namely, pixel (l, k) indicates a gray value of the pixel at a coordinate (l, k) of the backlight seed image. For example, when the LCD panel 130 has twelve backlight sources arranged in a matrix of 6-column and 2-row, it indicates that the backlight seed image has a width $W_{ref\_img}=6$ and a height $H_{ref\_img}=2$, i.e., a size of 6×2. The backlight sources are arranged in a matrix form with a dimension as same as the resolution of the backlight seed image. Namely, the width $W_{ref\_img}$ of the backlight seed image equals to the width of the matrix arrangement, and the height $H_{ref\_img}$ of the backlight seed image equals to the height of the matrix arrangement.

Step (C) calculates a plurality of positions corresponding to the backlight seed image based on coordinates of a backlight spread image. One position (x, y) of the plurality of positions in step (C) can be expressed as follows:

$$x = (p+0.5)\times\frac{W_{ref\_img}}{W_{des\_img}} - 0.5, \text{ and}$$

$$y = (q+0.5)\times\frac{H_{ref\_img}}{H_{des\_img}} - 0.5,$$

where p and q indicate a coordinate of the backlight spread image, $0 \le p \le W_{des\_img}-1$, $0 \le q \le H_{des\_img}-1$, $W_{des\_img}$ indicates a width of the backlight spread image, and $H_{des\_img}$ indicates a height of the backlight spread image. For example, when the LCD panel 130 has 1920×1080 pixels, it indicates that the backlight spread image has the width $W_{des\_img}=1920$ and the height $H_{des\_img}=1080$. Namely, the width $W_{des\_img}$ of the backlight spread image equals to the width of the LCD panel 130, and the height $H_{des\_img}$ of the backlight spread image equals to the height of the LCD panel 130.

Step (D) calculates the coordinates of the backlight seed image corresponding to the positions (x, y). The coordinates of the backlight seed image in step (D) can be expressed as follows:

$$l = \begin{cases} 0, & \text{if } \lfloor x \rfloor < 0 \\ \lfloor x \rfloor - 1, & \text{if } \lfloor x \rfloor \ge W_{ref\_img} \\ \lfloor x \rfloor, & \text{else} \end{cases},$$

and $$k = \begin{cases} 0, & \text{if } \lfloor y \rfloor < 0 \\ \lfloor y \rfloor - 1, & \text{if } \lfloor y \rfloor \ge H_{ref\_img} \\ \lfloor y \rfloor, & \text{else,} \end{cases}$$

where $\lfloor A \rfloor$ and $\lfloor y \rfloor$ each are a floor function.

Step (E) calculates distance differences (dx, dy) between the positions (x, y) and coordinates of the backlight seed image. The distance difference (dx, dy) in step (E) can be expressed as follows:

$$dx = \begin{cases} 0, & \text{if } \lfloor x \rfloor < 0 \text{ or if } \lfloor x \rfloor \ge W_{ref\_img} \\ x - l & elso, \end{cases}$$

and $$dy = \begin{cases} 0, & \text{if } \lfloor y \rfloor < 0 \text{ or if } \lfloor y \rfloor \ge H_{ref\_img} \\ y - k & elso. \end{cases}$$

Step (F) performs a bilinear transformation on pixels of the backlight seed image and the distance differences (dx, dy) so as to generate the backlight spread image. One pixel of the backlight seed image in step (F) can be expressed as follows:

$$v_{BL} = Pix(p, q) = c1\times(1-dy)(1-dx) + c2\times(1-dy)\times dx + c3\times dy\times(1-dx) + c4\times dy\times dx,$$

where $c_1$=pixel(l+1,k+1), $c_2$=pixel(l,k+1), $c_3$=pixel(l+1,k), and $c_4$=pixel(l,k) when $\lfloor x \rfloor \ge W_{ref\_img}$ and $\lfloor y \rfloor \ge H_{ref\_img}$; $c_1$=pixel(l+1,k), $c_2$=pixel(l,k), $c_3$=pixel(l+1,k+1), and $c_4$=pixel(l,k+1) when $\lfloor x \rfloor \ge W_{ref\_img}$ and $\lfloor y \rfloor < H_{ref\_img}$; $c_1$=pixel(l,k+1), $c_2$=pixel(l+1,k+1), $c_3$=pixel(l,k), and $c_4$=pixel(l+1,k) when $\lfloor x \rfloor < W_{ref\_img}$ and $\lfloor y \rfloor \ge H_{ref\_img}$; $c_1$=pixel(l,k), $c_2$=pixel(l+1,k), $c_3$=pixel(l,k+1), and $c_4$=pixel (l+1,k+1) when $\lfloor x \rfloor < W_{ref\_img}$ and $\lfloor y \rfloor < H_{ref\_img}$; and Pix(p, q) indicates a gray value of the pixel at a coordinate (p, q) of the backlight spread image.

Figure 3:
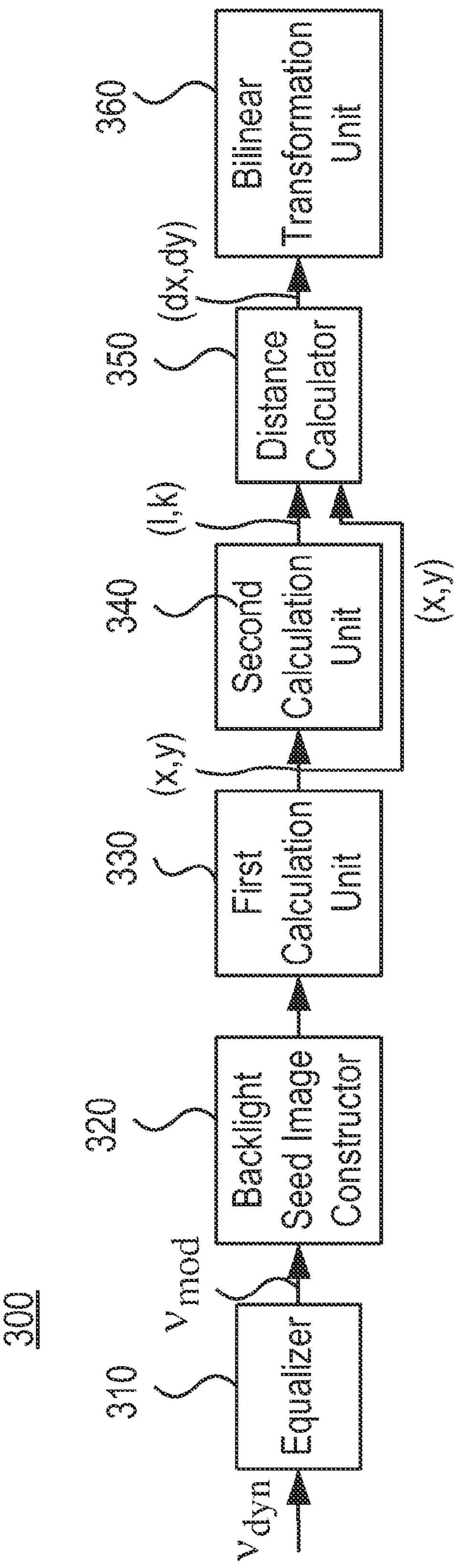
FIG. 3 is a block diagram of an apparatus of approximating backlight spread in a local dimming system in accordance with an embodiment of the invention.

FIG. 3 is a block diagram of an apparatus 300 of approximating backlight spread in a local dimming system in accordance with an embodiment of the invention. The apparatus 300 estimates the pixel values of an image after backlight spreading of a plurality of backlight sources in a local dimming system. The backlight sources are arranged in a matrix form. The apparatus 300 includes an equalizer 310, a backlight seed image constructor 320, a first calculation unit 330, a second calculation unit 340, a distance calculator 350, and a bilinear transformation unit 360.

As shown in FIGS. 1 and 3, the equalizer 310 receives backlight pulse width modulation (PWM) signals of the backlight sources 140 for performing an equalization operation on the PWM signals and generating corresponding equalization signals. The equalization operation can be expressed as follows:

$$v_{mod} = A\times\left(\frac{v_{dyn}}{A}\right)^{\frac{1}{\gamma}},$$

where $v_{mod}$ indicates equalization signal, $v_{dyn}$ indicates a backlight pulse width modulation signal, A indicates an adjustment parameter, and $\gamma=2.2$. In other embodiments, $\gamma$ is adjustable. The backlight pulse width modulation signal $v_{dyn}$ is used to adjust the brightness of the backlight source 140 of each block 131 of the LCD panel 130 and has a value ranging from 0 to 100. In this case, the equalization signal ranges from 0 to 255. When a backlight pulse width modulation signal $v_{dyn}$ is too small, it is likely to cause an overcompensation effect, and thus a Gamma correction is applied to the backlight pulse width modulation signal $v_{dyn}$.

The backlight seed image constructor 320 is connected to the equalizer 310 in order to receive the equalization signals so as to establish a backlight seed image. A pixel of the backlight seed image can be expressed as follows:

$$\text{pixel}(l,k) = v_{mod}(l,k),$$

where $0 \le l \le W_{ref\_img}-1$, $0 \le k \le H_{ref\_img}-1$, $W_{ref\_img}$ indicates a width of the backlight seed image, $H_{ref\_img}$ indicates a height of the backlight seed image, and pixel (l, k) indicates a gray value of the pixel at a coordinate (l, k) of the backlight seed image. For example, when the LCD panel 130 has twelve backlight sources 140 arranged in a matrix of 6-column and 2-row, it indicates that the backlight seed image has a width $W_{ref\_img}=6$ and a height $H_{ref\_img}=2$, i.e., a size of 6×2.

The first calculation unit 330 is connected to the backlight seed image constructor 320 for calculating a plurality of positions corresponding to the backlight seed image based on the coordinates of a backlight spread image. One position (x, y) of the plurality of positions can be expressed as follows:

$$x = (p + 0.5) \times \frac{W_{ref\_img}}{W_{des\_img}} - 0.5, \text{ and}$$

$$y = (q + 0.5) \times \frac{H_{ref\_img}}{H_{des\_img}} - 0.5,$$

where p and q indicate a coordinate of the backlight spread image, $0 \le p \le W_{des\_img}-1$, $0 \le q \le H_{des\_img}-1$, $W_{des\_img}$ indicates a width of the backlight spread image, and $H_{des\_img}$ indicates a height of the backlight spread image. For example, when the LCD panel 130 has 1920×1080 pixels, it indicates that the backlight spread image has the width $W_{des\_img}=1920$ and the height $H_{des\_img}=1080$.

The second calculation unit 340 is connected to the first calculation unit 330 for calculating the coordinates of the backlight seed image corresponding to the positions. A coordinate of the backlight seed image can be expressed as follows:

$$l = \begin{cases} 0, & \text{if } \lfloor x \rfloor < 0 \\ \lfloor x \rfloor - 1, & \text{if } \lfloor x \rfloor \ge W_{ref\_img} \\ \lfloor x \rfloor, & \text{else,} \end{cases}$$

and $$k = \begin{cases} 0, & \text{if } \lfloor y \rfloor < 0 \\ \lfloor y \rfloor - 1, & \text{if } \lfloor y \rfloor \ge H_{ref\_img} \\ \lfloor y \rfloor, & \text{else,} \end{cases}$$

where $\lfloor x \rfloor$ and $\lfloor y \rfloor$ each are a floor function.

The distance calculator 350 is connected to the second calculation unit 330 for calculating the distance differences (dx, dy) between the positions and coordinates of the backlight seed image. A distance difference (dx, dy) can be expressed as follows:

$$dx = \begin{cases} 0, & \text{if } \lfloor x \rfloor < 0 \text{ or} \\ & \text{if } \lfloor x \rfloor \ge W_{ref\_img} \\ x - l & \textit{elso,} \end{cases}$$

and $$dy = \begin{cases} 0, & \text{if } \lfloor y \rfloor < 0 \text{ or} \\ & \text{if } \lfloor y \rfloor \ge H_{ref\_img} \\ y - k & \textit{elso.} \end{cases}$$

The bilinear transformation unit 360 is connected to the distance calculator 350 for performing a bilinear transformation on pixels of the backlight seed image and the distance differences (dx, dy) so as to generate the backlight spread image. One pixel of the backlight seed image can be expressed as follows:

$$\begin{aligned} v_{BL} &= Pix(p, q) \\ &= c1 \times (1 - dy)(1 - dx) + c2 \times (1 - dy) \times \\ &\quad dx + c3 \times dy \times (1 - dx) + c4 \times dy \times dx, \end{aligned}$$

where $c_1$=pixel(l+1,k+1), $c_2$=pixel(l,k+1), $c_3$=pixel(l+1,k), and $c_4$=pixel(l,k) when $\lfloor x \rfloor \ge W_{ref\_img}$ and $\lfloor y \rfloor \ge H_{ref\_img}$; $c_1$=pixel(l+1,k), $c_2$=pixel(l,k), $c_3$=pixel(l+1,k+1), and $c_4$=pixel(l,k+1) when $\lfloor x \rfloor \ge W_{ref\_img}$ and $\lfloor y \rfloor < H_{ref\_img}$; $c_1$=pixel(l,k+1), $c_2$=pixel(l+1,k+1), $c_3$=pixel(l,k), and $c_4$=pixel(l+1,k) when $\lfloor x \rfloor < W_{ref\_img}$ and $\lfloor y \rfloor < H_{ref\_img}$; $c_1$=pixel(l,k), $c_2$=pixel(l+1,k), $c_3$=pixel(l,k+1), and $c_4$=pixel (l+1,k+1) when $\lfloor x \rfloor < W_{ref\_img}$ and $\lfloor y \rfloor < H_{ref\_img}$; and Pix(p, q) indicates a gray value of the pixel at a coordinate (p, q) of the backlight spread image.

In addition, for a typical bilinear transformation, the simulated backlight sources are not positioned at the center of each block. However, in view of the equations described above, it is known that, for generating the backlight spread image, the present invention simulates that each backlight source occupies an area at the center of the block so that the backlight spread starts with the center of the area to thus generate the backlight spread image meeting the actual condition.

The functions of the equalizer 310, the backlight seed image constructor 320, the first calculation unit 330, the second calculation unit 340, the distance calculator 350, and the bilinear transformation unit 360 can be performed by a digital signal processor (DSP) or completed by an application specific integrated circuit (ASIC).

Figure 4:
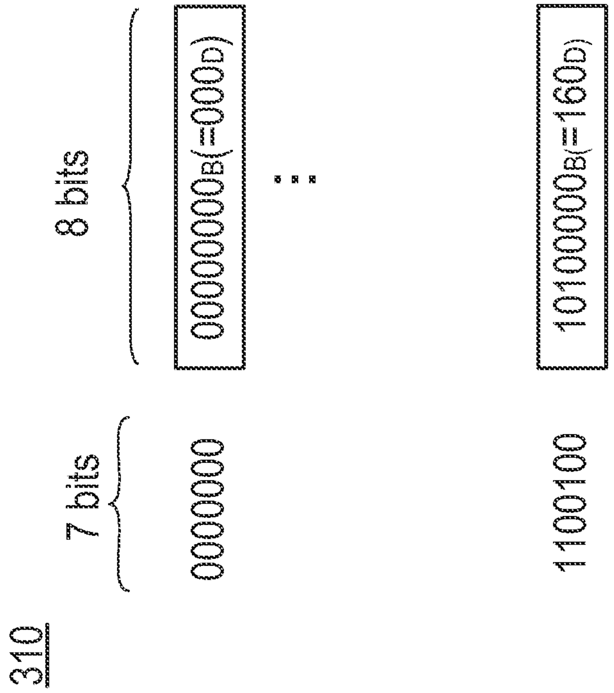
FIG. 4 is a schematic diagram of an equalizer in accordance with an embodiment of the invention.

For example, the equalizer 310 can be implemented with a lookup device. FIG. 4 is a schematic diagram of the equalizer 310 in accordance with an embodiment of the invention. As shown in FIG. 4, the equalization signal $V_{mod}$ corresponding to a backlight pulse width modulation signal $v_{dyn}$ is first calculated, and the integer portion of the equalization signal $v_{mod}$ is stored in a nonvolatile memory, so the backlight pulse width modulation signal $v_{dyn}$ in binary can be used as an address to find the equalization signal $V_{mod}$ stored in the memory. For example, when the backlight pulse width modulation signal $v_{dyn}$ is 100, i.e., "1100100" in binary, the equalization signal $v_{mod}$ is 166.63. And, the integer part, 166, is stored in the memory address "1100100", so the backlight pulse width modulation signal $v_{dyn}$ in binary can be used as an address to find the equalization signal $v_{mod}$ stored in the memory. The backlight pulse width modulation signal $v_{dyn}$ ranges from 0 to 100, and the equalization signal $v_{mod}$ ranges from 0 to 255. In this case, the addresses of the nonvolatile memory are expressed by seven bits, and the stored data is expressed by eight bits.

In view of the foregoing, it is known that the invention regards the backlight sources of the LCD as a backlight seed image, and the positions of pixels of the backlight seed image respectively correspond to the backlight sources arranged in a matrix form. The pixel values of the backlight seed image are the equalization signals $v_{mod}$. The equalization signals $v_{mod}$ are used as a seed to generate the backlight spread image. Therefore, the invention is free from the convolution operation, which has to be performed on a light spread function and the backlight values decided for the blocks in the prior art, thereby avoiding the complicated calculation and the hardware cost and operation time waste. In addition, since the bilinear transformation is used, the blocking effect between the blocks of the display can be eliminated effectively.

Upon the obtained backlight spread image, each block image of the backlight spread image presents the effect of positioning the backlight source at the center of the block image when the number of backlight sources is as same as that of blocks.

Although the present invention has been explained in relation to its preferred embodiment, it is to be understood that many other possible modifications and variations can be made without departing from the spirit and scope of the invention as hereinafter claimed.

What is claimed is:

1. A method of approximating backlight spread in a local dimming system, for use in an LCD device to estimate a backlight spread image corresponding to an image after backlight spreading of a plurality of backlight sources, wherein the image, the backlight spread image, and the LCD device having same resolution, the backlight sources being arranged in a matrix form, the method comprising the steps of:

(A) receiving backlight pulse width modulation signals from the backlight sources for performing an equalization operation on the backlight pulse width modulation signals and generating equalization signals correspondingly;

(B) establishing a backlight seed image based on the equalization signals;

(C) calculating a plurality of positions corresponding to the backlight seed image based on coordinates of the backlight spread image;

(D) calculating coordinates of the backlight seed image corresponding to the plurality of positions;

(E) calculating distance differences between the plurality of positions and the coordinates of the backlight seed image; and (F) performing a bilinear transformation on pixels of the backlight seed image and the distance differences so as to generate the backlight spread image.

2. The method as claimed in claim 1, wherein the equalization operation in step (A) is expressed as:

$$v_{mod} = A \times \left(\frac{v_{dyn}}{A}\right)^{\frac{1}{\gamma}},$$

where $v_{mod}$ indicates the equalization signal, $v_{dyn}$ indicates the backlight pulse width modulation signal, A indicates an adjustment parameter, and γ is an adjustable value.

3. The method as claimed in claim 2, wherein A is 255 and γ is 2.2 when the image is an RGB format with eight bits.

4. The method as claimed in claim 2, wherein when the backlight pulse width modulation signal is too small, a Gamma correction operation is applied to the backlight pulse width modulation signal for reducing an overcompensation effect.

5. The method as claimed in claim 1, wherein a resolution of the backlight seed image is as same as a dimension of the backlight sources arranged in a matrix form.

6. The method as claimed in claim 5, wherein a pixel of the backlight seed image is expressed as:

$$\text{pixel}(l,k)=v_{mod}(l,k),$$

where $0 \le l \le W_{ref\_img}-1$, $0 \le k \le H_{ref\_img}-1$, $W_{ref\_img}$ indicates a width of the backlight seed image, $H_{ref\_img}$ indicates a height of the backlight seed image, pixel (l,k) indicates a gray value of the pixel at a coordinate (l, k) of the backlight seed image, and the backlight seed image and the matrix arrangement have same height.

7. The method as claimed in claim 6, wherein one position (x,y) of the positions in step (C) is expressed as:

$$x = (p + 0.5) \times \frac{W_{ref\_img}}{W_{des\_img}} - 0.5, \text{ and}$$

-continued $$y = (q + 0.5) \times \frac{H_{ref\_img}}{H_{des\_img}} - 0.5,$$

where p and q indicate a coordinate of the backlight spread image, $0 \le p \le W_{des\_img}-1$, $0 \le q \le H_{des\_img}-1$, $W_{des\_img}$ indicates a width of the backlight spread image, and $H_{des\_img}$ indicates a height of the backlight spread image.

8. The method as claimed in claim 7, wherein a coordinate of the backlight seed image in step (D) is expressed as:

$$l = \begin{cases} 0, & \text{if } \lfloor x \rfloor < 0 \\ \lfloor x \rfloor - 1, & \text{if } \lfloor x \rfloor \ge W_{ref\_img} \\ \lfloor x \rfloor, & \text{else,} \end{cases}$$

and $$k = \begin{cases} 0, & \text{if } \lfloor y \rfloor < 0 \\ \lfloor y \rfloor - 1, & \text{if } \lfloor y \rfloor \ge H_{ref\_img} \\ \lfloor y \rfloor, & \text{else,} \end{cases}$$

where ⌊x⌋ and ⌊y⌋ each are a floor function.

9. The method as claimed in claim 8, wherein a distance difference (dx,dy) in step (E) is expressed as:

$$dx = \begin{cases} 0, & \text{if } \lfloor x \rfloor < 0 \text{ or if } \lfloor x \rfloor \ge W_{ref\_img} \\ x - l & elso, \end{cases}$$

and $$dy = \begin{cases} 0, & \text{if } \lfloor y \rfloor < 0 \text{ or if } \lfloor y \rfloor \ge H_{ref\_img} \\ y - k & elso. \end{cases}$$

10. The method as claimed in claim 9, wherein one pixel of the backlight seed image in step (F) is expressed as:

$$\begin{aligned} v_{BL} &= Pix(p, q) \\ &= c1 \times (1 - dy)(1 - dx) + c2 \times (1 - dy) \times \\ &\quad dx + c3 \times dy \times (1 - dx) + c4 \times dy \times dx, \end{aligned}$$

where $c_1$=pixel(l+1,k+1), $c_2$=pixel(l,k+1), $c_3$=pixel(l+1,k), and $c_4$=pixel(l,k) when ⌊x⌋≥$W_{ref\_img}$ and ⌊y⌋≥$H_{ref\_img}$; $c_1$=pixel(l+1,k), $c_2$=pixel(l,k), $c_3$=pixel(l+1,k+1), and $c_4$=pixel(l,k+1) when ⌊x⌋≥$W_{ref\_img}$ and ⌊y⌋<$H_{ref\_img}$; $c_1$=pixel(l,k+1), $c_2$=pixel(l+1,k+1), $c_3$=pixel(l,k), and $c_4$=pixel(l+1,k) when ⌊x⌋<$W_{ref\_img}$ and ⌊y⌋≥$H_{ref\_img}$; $c_1$=pixel(l,k), $c_2$=pixel(l+1,k), $c_3$=pixel(l,k+1), and $c_4$=pixel (l+1,k+1) when ⌊x⌋<$W_{ref\_img}$ and ⌊y⌋<$H_{ref\_img}$; and Pix(p, q) indicates a gray value of the pixel at a coordinate (p, q) of the backlight spread image.

11. An apparatus of approximating backlight spread in a local dimming system, for use in an LCD device to estimate a backlight spread image corresponding to an image after backlight spreading of a plurality of backlight sources, wherein the image, the backlight spread image, and the LCD device having same resolution, the backlight sources being arranged in a matrix form, the apparatus comprising:

an equalizer, for receiving backlight pulse width modulation signals of the backlight sources in order to perform an equalization operation and generate equalization signals correspondingly;

a backlight seed image constructor, connected to the equalizer, for receiving the equalization signals to establish a backlight seed image;

a first calculation unit, connected to the backlight seed image constructor, for calculating a plurality of positions corresponding to the backlight seed image based on coordinates of the backlight spread image;

a second calculation unit, connected to the first calculation unit, for calculating coordinates of the backlight seed image corresponding to the positions;

a distance calculator, connected to the second calculation unit, for calculating distance differences between the plurality of positions and the coordinates of the backlight seed image; and a bilinear transformation unit, connected to the distance calculator, for performing a bilinear transformation on pixels of the backlight seed image and the distance differences so as to generate the backlight spread image.

12. The apparatus as claimed in claim 11, wherein the equalization operation performed by the equalizer is expressed as:

$$v_{mod} = A \times \left(\frac{v_{dyn}}{A}\right)^{\frac{1}{\gamma}},$$

where $v_{mod}$ indicates equalization signal, $v_{dyn}$ indicates backlight pulse width modulation signal, A indicates an adjustment parameter, and γ is an adjustable value.

13. The apparatus as claimed in claim 12, wherein A is 255 and γ is 2.2 when the image is an RGB format with eight bits.

14. The apparatus as claimed in claim 12, wherein when the backlight pulse width modulation signal is too small, a Gamma correction operation is applied to the backlight pulse width modulation signal for reducing an overcompensation effect.

15. The apparatus as claimed in claim 12, wherein the equalization signals are stored in a nonvolatile memory, and the backlight pulse width modulation signal in binary is used as an address to find the equalization signal corresponding to the backlight pulse width modulation signal.

16. The apparatus as claimed in claim 11, wherein a resolution of the backlight seed image is as same as a dimension of the backlight sources arranged in a matrix form, and a pixel of the backlight seed image established by the backlight seed image constructor is expressed as:

$$\text{pixel}(l,k)=v_{mod}(l,k),$$

where $0 \le l \le W_{ref\_img}-1$, $0 \le k \le H_{ref\_img}-1$, $W_{ref\_img}$ indicates a width of the backlight seed image, $H_{ref\_img}$ indicates a height of the backlight seed image, pixel (l,k) indicates a gray value of the pixel at a coordinate (l, k) of the backlight seed image, and the backlight seed image and the matrix arrangement have same height.

17. The apparatus as claimed in claim 16, wherein one position (x, y) of the positions calculated by the first calculation unit is expressed as:

$$x = (p+0.5)\times\frac{W_{ref\_img}}{W_{des\_img}} - 0.5, \text{ and}$$

$$y = (q+0.5)\times\frac{H_{ref\_img}}{H_{des\_img}} - 0.5,$$

where p and q indicate a coordinate of the backlight spread image, $0 \le p \le W_{des\_img}-1$, $0 \le q \le H_{des\_img}-1$, $W_{des\_img}$ indicates a width of the backlight spread image, and $H_{des\_img}$ indicates a height of the backlight spread image.

18. The apparatus as claimed in claim 17, wherein a coordinate of the backlight seed image calculated by the second calculation unit is expressed as:

$$l = \begin{cases} 0, & \text{if } \lfloor x \rfloor < 0 \\ \lfloor x \rfloor - 1, & \text{if } \lfloor x \rfloor \ge W_{ref\_img} \\ \lfloor x \rfloor, & \text{else,} \end{cases}$$

and $$k = \begin{cases} 0, & \text{if } \lfloor y \rfloor < 0 \\ \lfloor y \rfloor - 1, & \text{if } \lfloor y \rfloor \ge H_{ref\_img} \\ \lfloor y \rfloor, & \text{else,} \end{cases}$$

where ⌊x⌋ and ⌊y⌋ are each a floor function.

19. The apparatus as claimed in claim 18, wherein a distance difference (dx, dy) calculated by the distance calculator is expressed as:

$$dx = \begin{cases} 0, & \text{if } \lfloor x \rfloor < 0 \text{ or if } \lfloor x \rfloor \ge W_{ref\_img} \\ x - l & elso, \end{cases}$$

and $$dy = \begin{cases} 0, & \text{if } \lfloor y \rfloor < 0 \text{ or if } \lfloor y \rfloor \ge H_{ref\_img} \\ y - k & elso. \end{cases}$$

20. The apparatus as claimed in claim 19, wherein one pixel of the backlight seed image generated by the bilinear transformation unit is expressed as:

$$\begin{aligned} v_{BL} &= Pix(p,q) \\ &= c1\times(1-dy)(1-dx) + c2\times(1-dy)\times dx + c3\times dy\times(1-dx) + c4\times dy\times dx, \end{aligned}$$

where $c_1$=pixel(l+1,k+1), $c_2$=pixel(l,k+1), $c_3$=pixel(l+1,k), and $c_4$=pixel(l,k) when $\lfloor x \rfloor \ge W_{ref\_img}$ and $\lfloor y \rfloor \ge H_{ref\_img}$; $c_1$=pixel(l+1,k), $c_2$=pixel(l,k), $c_3$=pixel(l+1,k+1), and $c_4$=pixel(l,k+1) when $\lfloor x \rfloor \ge W_{ref\_img}$ and $\lfloor L \rfloor < H_{ref\_img}$; $c_1$=pixel(l,k+1), $c_2$=pixel(l+1,k+1), $c_3$=pixel(l,k), and $c_4$=pixel(l+1,k) when $\lfloor x \rfloor < W_{ref\_img}$ and $\lfloor y \rfloor \ge H_{ref\_img}$; $c_1$=pixel(l,k), $c_2$=pixel(l+1,k), $c_3$=pixel(l,k+1), and $c_4$=pixel (l+1,k+1) when $\lfloor x \rfloor < W_{ref\_img}$ and $\lfloor y \rfloor < H_{ref\_img}$; and Pix(p, q) indicates a gray value of the pixel at a coordinate (p, q) of the backlight spread image.

* * * * *